United States Patent [19]

Alford

[11] 4,148,378
[45] Apr. 10, 1979

[54] TANDEM WHEEL PARK BRAKE LOCK

[76] Inventor: Thomas G. Alford, 603 Florence Ave., Vicksburg, Miss. 39180

[21] Appl. No.: 852,731

[22] Filed: Nov. 18, 1977

[51] Int. Cl.² .......................................... F16D 63/00
[52] U.S. Cl. ........................................ 188/74; 188/32
[58] Field of Search .............. 188/1 R, 2 R, 29, 31, 188/32, 36, 52, 57, 74, 78; 104/257; D12/217; 70/225, 226, 228

[56] References Cited

U.S. PATENT DOCUMENTS

| 433,413 | 7/1890 | Lawrence | 188/52 |
|---|---|---|---|
| 511,198 | 12/1893 | Donovan | 188/52 |
| 2,239,592 | 4/1941 | Conner | 188/52 |
| 2,773,564 | 12/1956 | Garard | 188/32 |
| 3,059,728 | 10/1962 | McKuskie | 188/2 R |
| 3,289,794 | 12/1966 | Miles | 188/32 |
| 3,318,419 | 5/1967 | Chastain | 188/32 |
| 3,548,975 | 12/1970 | Herndon | 188/29 |

*Primary Examiner*—Edward R. Kazenske
*Attorney, Agent, or Firm*—Cushman, Darby & Cushman

[57] ABSTRACT

A portable parking brake for use with tandemly mounted wheels of a vehicle including a pair of brake shoes mounted on a central shaft with at least one of the brake shoes being movable horizontally away from the other along that shaft so that each brake shoe can contact the central area of one of the tandemly mounted wheels. Also included is an adjusting means for moving the pair of brake shoes into braking engagement with the wheels to effect the shoes' braking condition.

16 Claims, 4 Drawing Figures

TANDEM WHEEL PARK BRAKE LOCK

BACKGROUND OF THE INVENTION

This invention relates to a portable braking device for use with tandemly mounted wheels and more particularly to a portable braking device for use in braking tandem wheels of a wide variety of vehicles.

A convenient method of braking tandem wheels of camping trailers, mobile homes, small or large trucks as well as other vehicles which employ tandemly mounted wheels has long been sought and many attempts at providing a convenient device for accomplishing this have been proposed. The spacing between tandem wheels varies widely which presents certain adjustability problems and many of the prior art braking devices, which have worked in a vertical direction, have used braking elements having a fixed size. The present invention also includes a plurality of parts between two embodiments which can be used interchangeably thereby extending the adjustability of the present invention thereby allowing it to work with a wide variety of wheel spacings.

Early attempts at providing means for braking tandem wheeled vehicles consisted of chock assemblies such as is set forth in U.S. Pat. No. 3,318,419. This device was comprised of two hollow cylindrical members which would be placed on the ground and forceably separated from one another so that they contacted both the ground and the tandem wheels. Another chock type of device is shown in U.S. Pat. No. 3,695,394 wherein two triangular wedge members are also placed on the ground and forced apart until each contacted the wheels similar to the previous device. This device was also lockable in a braking position.

The next phase in the development of braking devices for tandem wheels involved the use of vertically movable upper and lower braking members. The device would be placed in-between the tandem wheels and the upper and lower members would then be moved toward one another so that each member engaged both of the wheels. Devices exemplary of this type are set forth in U.S. Pat. Nos. 3,548,975 and 3,712,424. The devices disclosed in these latter patents employed upper and lower braking members having a fixed size, which limited their use to tandem wheels spaced apart a distance comparable to that fixed size. In addition, both of these latter devices employed braking members which produced only two points of contact with each of the wheels.

SUMMARY OF THE INVENTION

The portably braking device set forth in the present invention is comprised of a pair of brake shoes including a main and a V-shaped element constructed, for example, from flat iron. A central shaft is provided for connecting the pair of brake shoes together. One of the brake shoes is preferably welded to one end of that shaft while the other brake shoe is slidably mounted on that shaft. Further, the central shaft is threaded, at least along a portion thereof, with the threaded portion being the area where the movable brake shoe is supported so that an adjusting bolt or nut can be moved along the same threaded portion to forceably move the movable brake shoe away from the other in a horizontal direction. The device can be placed in the center area between two tandemly mounted wheels and by moving the nut or adjusting means, the two brake shoes can be moved away from each other horizontally into braking engagement with the tires. Each of the brake shoes is designed to provide three points of contact with the tire with one of those points of contact occurring at the very center of the V-shaped element. In addition, a lock can be used to lock the adjusting means after the brake shoes have been brought into braking engagement with the wheels so that subsequent movement or removal of the brake is prohibited until the lock is removed.

Thus, the primary object of the present invention is to improve prior art braking devices for tandem wheels and to provide a braking device capable of braking tandemly mounted wheels where the spacing between the wheels can vary over a relatively wide range. In addition, another object of the present invention is to provide a portable braking device for tandemly mounted wheels which is more simply constructed than the prior art devices and which makes use of horizontal forces to stabilize the brake device.

The present invention together with other objects and novel features and advantages thereof as well as the particular construction, combination and arrangement of parts which comprises the same will perhaps be best understood from the following detailed description when considered in connection with the accompanying drawings which form a part hereof and illustrate a number of various embodiments of the present invention.

DETAILED DESCRIPTION OF THE DRAWINGS

Figure 1:
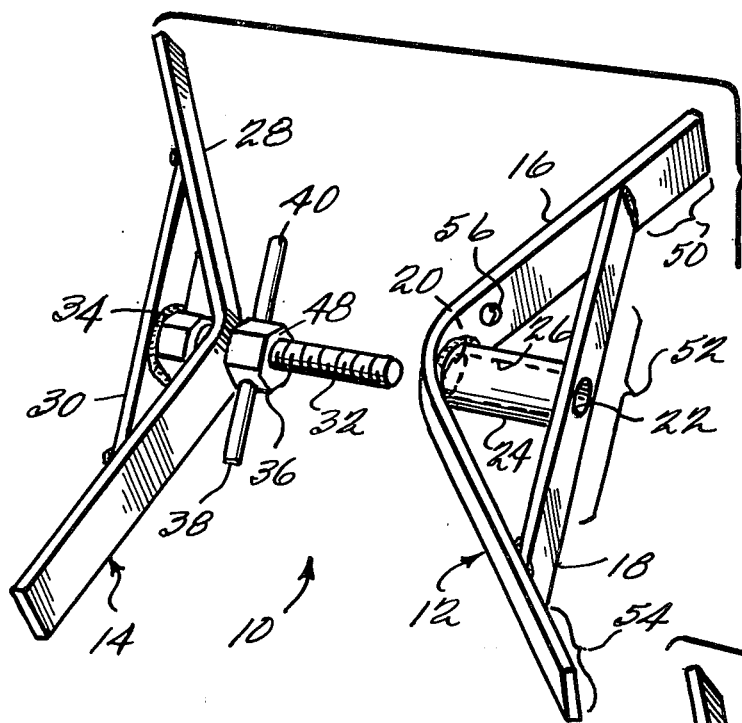
FIG. 1 is an exploded perspective view of one embodiment of the present invention.

Turning now to the first embodiment of the present invention, attention is directed to FIG. 1 of the drawings showing a braking device, generally indicated by reference numeral 10, as including a right brake shoe assembly 12 and a left brake shoe assembly 14. The right brake shoe assembly 12 is comprised of a V-shaped brake shoe element 16 and a reinforcing bar 18 spanning across the open portion of the V-shaped element 16. Reinforcing bar 18 is securely attached, as for example by welding, at each end to V-shaped element 16. A hole or opening 20 is provided at the apex of the V-shaped element 16 and extends therethrough and a second hole 22 is provided in the central portion of reinforcing bar 18 which is in axial alignment with hole 20. A hollow cylindrical pipe member 24 having a smooth interior bore 26 is connected to the interior surface of V-shaped element 16 and reinforcing bar 18 and spans therebetween. Pipe member 24 is preferably welded to both V-shaped element 16 and reinforcing bar 18 with the smooth interior bore 26 serving to connect openings 20 and 22 together thereby forming a passageway extending entirely through the right brake shoe assembly 12.

The left brake shoe assembly 14 is also constructed of a V-shaped brake shoe element 28 and a reinforcing bar 30 with reinforcing bar 30 also being secured, as by welding, in the open side of the V-shaped element 28. The V-shaped brake shoe element 28 is provided with an opening at its apex (not shown) through which the threaded portion of bolt 32 can extend as shown. A portion of bolt 32 also extends between reinforcing bar 30 and the inside surface of V-shaped element 28 and as shown in FIG. 1, that portion of bolt 32 is secured, as by welding 34, to the inside surface of reinforcing bar 30. An adjusting device such as nut 36 having arms 38 and 40 threadily engages the threaded portion of bolt 32 so that when turned it will move along the length of bolt 32 exposed beyond V-shaped element 28.

Figure 3:
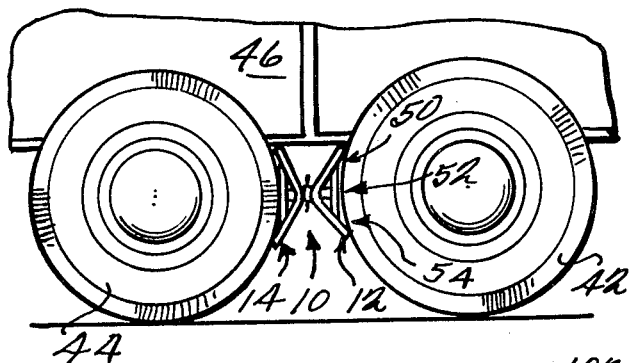
FIG. 3 is a diagrammatic side elevational view of two tandem wheels with a brake assembly according to the present invention positioned therebetween.

The holes 20 and 22 as well as bore 26 are sized so that bolt 32 can slide therethrough so that the right and left brake shoe assembly 12 and 14 can fit together with bolt 32 slidably retained within holes 20, 22 and bore 26. When brake assembly 10 is placed between tandemly mounted wheels 42 and 44 of a vehicle 46 as is shown in FIG. 3, the adjusting device or nut 36 can be rotated so that edge surface 48 will contact the exposed apex area of V-shaped element 16 adjacent hole 20 and act as a camming surface to force the right brake shoe assembly 12 away from the left brake shoe assembly 14 causing those brake shoes respectively to engage wheels 42 and 44. It should be noted that when the braking device 10 is positioned in between the spaced apart tandemly mounted wheels, the bolt 32 which acts as the main supporting shaft for the two brake shoe assemblies and is shorter than the space between the wheels lies substantially within the plane established by the axes of the wheels 42 and 44. Likewise, the brake shoe assemblies 12 and 14 engage the wheels 42 and 44 in a central area adjacent the closest point between the spaced apart wheels.

With reference specifically to the right brake shoe assembly 12 in FIG. 1, the positioning of reinforcing bar 18 within V-shaped element 16 will produce three brake shoe surface contact areas 50, 52 and 54 which, as shown in FIG. 3, will ultimately come into engagement with the outer peripheral surface of the tire. The left brake shoe assembly 14 will also have three similar contact surface areas since its structure is similar to the right brake shoe assembly 12. These three surfaces, 50, 52 and 54 together provide essentially three areas or points of contact which securely hold the brake shoe assemblies 12 and 14 in a braking condition and also serve to effectively prohibit further rotation of tandem wheels 42 and 44 once the braking assembly 10 is placed in its full braking position. In addition, by having the central portion of the reinforcing bars 18 and 30 positioned where they are it is possible to obtain an extremely tight horizontal braking engagement between brake shoe assemblies 12 and 14 and wheels 42 and 44.

Since it is sometimes desirable to be able to lock a brake assembly 10 and its braking condition between wheels 42 and 44, a locking opening 56 is provided in the V-shaped element 16 adjacent pipe member 24. When the adjusting nut 36 was adjusted so as to force brake shoes 12 and 14 into engagement with tires or wheels 42 and 44 shown in FIG. 3, the adjusting nut 36 could be turned an additional amount due to the inherent resiliency of the wheels until one of the arms 38 or 40 was substantially in alignment with hole 56. Thereafter, the locking arm of a conventional pad lock could be placed through hole 56 and around either arm 38 or 40 and then locked so that further rotation of adjusting nut 36 could be prevented until the lock was removed.

The braking device 10 shown in FIG. 1 can, for example, be constructed from pieces of flat iron which are about two inches wide and a quarter inch thick. As an example of one such device, member 16 can be constructed from an 11 inch piece of flat iron as described above bent so that an angle between the leg portions of element 16 was approximately 107°. The reinforcing bar 18 made from the same flat iron stock could then be approximately 6 inches in length such that the inside opening of the right brake shoe 12 would be about 9 inches measuring from the outer area of surface 50 to a like place on surface 54. The pipe member 26 could be comprised of a 2 inch pipe section having an outer diameter of $\frac{3}{8}$ inches and an internal bore diameter of about $\frac{1}{4}$ inch with that internal bore being smooth. V-shaped member 28 could also be constructed from flat iron and specifically from a piece of about 10$\frac{1}{4}$ inches long bent so that the angle formed between the two legs of that element is approximately 130°. The reinforcing bar 30 in this instance would be about 5 inches long and could be spaced from the inner surface of the V-shaped member 28 approximately 1 inch. This would provide an opening for element 28 of approximately 9$\frac{1}{4}$ inches. Bolt 32 could, for example, be a $\frac{1}{4}$ inch machine bolt 4$\frac{1}{2}$ inches in length so that the adjusting nut 36 would also have an internal diameter of $\frac{1}{4}$ inch. This particular combination can be employed with tandem wheels which are spaced apart from about 4 inches to about 5$\frac{3}{4}$ inches.

Since trailers and mobile homes employ tandem wheels which vary in spacing from about 2$\frac{1}{2}$ inches apart in their closest position to about 5$\frac{3}{4}$ or about 6 inches, the first embodiment as just described will be useful to brake the vehicles at the higher end of that range.

Figure 2:
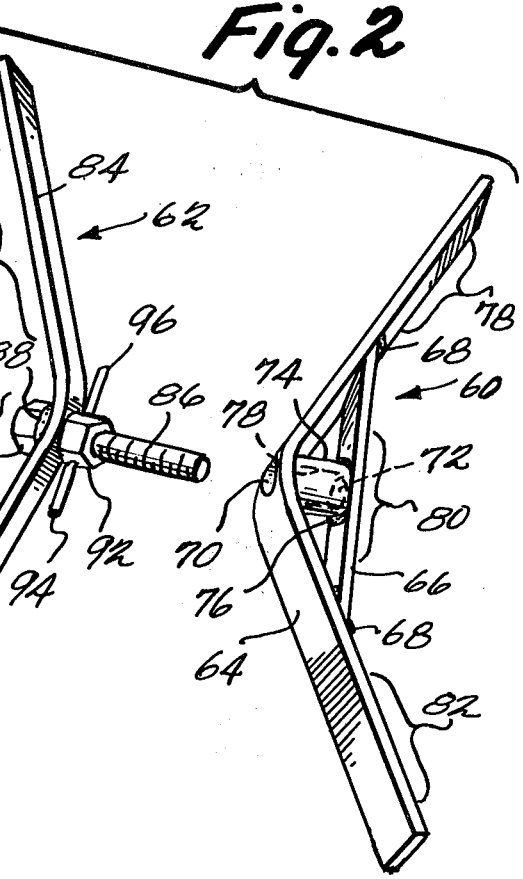
FIG. 2 is an exploded perspective of another embodiment of the present invention.

In order to effectively brake tandem wheeled vehicles in the lower end of that range, a second embodiment of the present invention is provided as shown in FIG. 2. This embodiment also employs right and left brake shoe assemblies 60 and 62. The right brake shoe assembly 60 is somewhat similar in construction to assembly 12 shown in FIG. 1 and includes a V-shaped brake shoe element 64 and a reinforcing bar 66 welded as at 68 across the open side of the V-shaped brake shoe element 64. A hole 70 is provided at the apex of V-shaped element 64 and extends through that member and a second hole 72 is provided in the central portion of reinforcing bar 66 with hole 72 being in axial alignment with hole 70. A hollow pipe segment 74 is welded between the interior surfaces of V-shaped segment 64 and reinforcing bar 66 as for example by welding 76 and as was true with the FIG. 1 embodiment, pipe segment 74 is provided with a smooth internal bore 78 which connects holes 70 and 72 together. Holes 70 and 72 along with bore 78 of pipe segment 74 form a passageway extending entirely through the right brake shoe assembly 60.

This right brake shoe assembly 60 when constructed in this fashion will also produce three contact surfaces 78, 80 and 82 which will engage the periphery of a tire and cooperate to support the brake shoe thereon.

The left brake shoe assembly 62 is comprised of a V-shaped brake shoe element 84 and the threaded portion of a bolt 86 extends through an opening (not shown) which is provided at the apex of V-shaped member 84. The head end 90 of bolt 86 is welded, as by welding shown at 88, to the V-shaped element 84 so that head end 90 is positioned on the open side of V-shaped element 84. An adjusting nut 92, provided with arms 94 and 96, is threadily engaged on the thus exposed threaded portion of bolt 86 and again will serve as an adjusting device for forcing the right brake shoe assembly 60 away from the left brake shoe assembly 62 after bolt 86 is inserted in the passageway defined by openings 70 and 72 and in internal bore 78 of pipe member 74.

The left brake shoe assembly is also provided with three contact surfaces shown at 98, 100 and 102 which respectively comprise the inner surface of the top leg portion of V-shaped element 84, the head end of bolt 86 and the interior surface of the lower portion of V-shaped element 84. When the embodiment shown in FIG. 2 is placed between a pair of tandemly mounted wheels, the right brake shoe assembly will come into contact with the right wheel along surfaces 78, 80 and 82 while the left brake shoe assembly 62 will engage its wheel along surfaces 98, 100 and 102.

As an exemplary example of a brake shoe device as shown in FIG. 2, the right brake shoe assembly 60 could also be constructed from flat iron segments ¼ inch thick by 2 inches in width with V-shaped element 64 being constructed of a piece approximately 12 inches long and bent at an angle of 170° while reinforcing bar 66 is constructed from a piece about 4 inches long. With the reinforcing bar welded as shown in FIG. 2, the inside opening of V-shaped element 64 would be approximately 10½ inches.

The left brake shoe assembly 62 could also be constructed from similar flat iron segments with V-shaped element 84 being formed from a 12 inch length bent to produce an angle of about 140° making an inside opening of about 11 inches. The threaded bolt 86 could be, for example, a number 3 bolt having a diameter of ½ inch and being 3 inches long with pipe segment 74 being constructed from a piece of steel tubing having a ½ inch internal diameter opening extending therethrough with opening 70 and 72 likewise having a diameter of approximately ½ inch. Therefore, bolt 86 could easily extend through the passageway defined by openings 70 and 72 and the internal diameter 78 of pipe segment 74. The adjusting nut 92 would also have a ½ inch internal diameter which would, therefore, be freely rotatable along the threaded portion of bolt 86.

This particular combination can be used with tandem wheels having an opening ranging between about 2½ inches to about 3½ inches. For tandem wheels which are spaced apart from about 3½ to about 4½ inches it would be possible to use the right brake shoe element 60 of the FIG. 2 embodiment together with the left brake shoe assembly 14 of the FIG. 1 embodiment.

Figure 4:
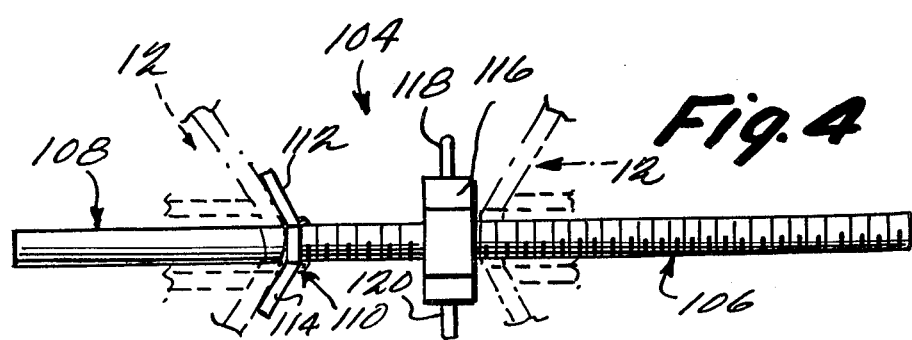
FIG. 4 is a side elevational view of an alternative adjusting pin for use with portions of the embodiment shown in FIG. 1 in order to cover a wider span between tandem wheels.

For tandem wheel assemblies having an opening larger than 5¾ inches, an enlarged universal adjusting pin can be used and is set forth in FIG. 4. It is contemplated that two brake shoes such as right brake shoe assemblies 12 shown in FIG. 1 would be used with this pin and these are shown in phantom in FIG. 4 at 12. The universal pin, generally designated at 104, is comprised of a stiff rod having a threaded portion 106 and an unthreaded portion 108. A stop member 110 is welded or otherwise securely fixed to universal pin 104 where the threaded and unthreaded portions join and is comprised of two fixed arms 112 and 114 which serve to engage the outer surface of the brake shoe assembly 12 adjacent the apex portion of that shoe. An adjusting nut 116 is threadily secured to the threaded portion 106 of pin 104 and, as was the case with the other adjusting nuts, arms 118 and 120 are provided to give additional leverage for forcing the brake shoes into braking engagement with the wheels being braked. As is clear from the phantom showings of the brake shoe element 12, one brake shoe element is supported on the un-threaded portion of pin 104 which is inserted through the passageway defined by openings 20 and 22 and the internal bore 26 of pipe member 24. The threaded portion 106 of pin 104 is placed through a like passageway in a second similar brake shoe. The whole assembly would then be positioned between the tandem wheels and the adjusting nut 16 is screwed upon the threaded portion 106 of the pin 104 until the two brake shoes 12 are forced apart into firm engagement with wheels being braked. Universal pin 104 again has a ½ inch diameter and is about 4 inches in length and can be used to effectively brake trucks having openings between tandemly mounted wheels which are from 7 to 8½ inches. It is believed that the three-surface contact provided by the present invention along with the half inch central shaft provides sufficient resistance to any bending moments that might be applied by reason of the forces created should the tires try to rotate. In addition, it is believed that by providing three points of contact along the braking surface of the brake shoes, more effective braking can be provided and the resolution of any such forces is better than prior art devices employing only two contact surfaces per brake shoe element.

It has been indicated hereinbefore that the braking device is preferably made from lengths of flat iron but it should be well understood that any number of types of materials such as steel, aluminum, or high strength plastic could also be used, the only essential requirement being that the materials be strong and sturdy. Exemplary of such high strength plastics are styrene-acrylonitrile copolymers, vinyl polymers, polyester copolymers, phenol-aldehyde polymers and the like.

It will now be clear that there is provided a device which accomplishes the various objectives heretofore set forth. While the invention has been disclosed in its preferred forms, it is to be well understood that the specific embodiments thereof as described and illustrated herein should not be considered in a limited sense as there may be other forms or modifications of the present invention which should also be construed as coming within the scope of the appended claims.

What I claim is:

1. A portable parking brake for use between tandemly mounted wheels comprising a pair of brake shoes mounted on a central shaft having a length less than the minimum distance between the tandemly mounted wheels with at least one of said brake shoes being slidably mounted on said central shaft and adjusting means for moving said at least one slidably mounted brake shoe away from the other in a horizontal direction, each brake shoe having a first brake shoe element comprising a member, having an inner side and an outer side, shaped to define an opening into which the outer periphery of the wheel can fit, a second brake shoe element comprising a separate member, having an inner and outer side, secured and recessed within the opening of said first brake shoe element thereby defining leg portions on the first brake shoe element extending outwardly from the point at which the second brake shoe element is secured so that when the brake is positioned between the tandemly mounted wheels midway between the top and bottom of the wheels and the adjusting means is operated to force the brake shoes apart a predetermined portion of each of the inner sides of the leg portions of the first brake shoe element and a predetermined portion of the inner side of the second brake shoe element of each of said brake shoes will be forced into braking contact with one of the tandemly mounted wheels.

2. A parking brake as in claim 1 wherein at least one of said brake shoes includes means defining an opening located adjacent said central shaft for receiving the locking arm of a padlock so that the brake can be locked in place.

3. A braking device for a vehicle having spaced apart tandem wheels including a support shaft having a length less than the minimum spacing between the tandem wheels, a pair of brake shoe assemblies mounted on said support shaft and adjusting means provided on said shaft between said pair of brake shoe assemblies for moving the brake shoe assemblies away from one another along a path defined by said support shaft, each of said brake shoe assemblies including first and second brake shoe elements, said first brake shoe element comprising a V-shaped member mounted on said support shaft at the apex thereof, said second brake shoe element comprising a member attached within the opening side of said V-shaped member so that when the braking device is positioned between the minimum spacing of the tandem wheels and the adjusting means is operated to move the brake shoe assemblies apart, each of the brake shoe assemblies is thereby brought into engagement with one of the tandem wheels and both said first and second brake shoe elements contact the surface of each respective wheel.

4. A braking device as in claim 3 wherein each brake shoe assembly includes at least three contact surfaces for engaging a wheel when in braking engagement therewith.

5. A braking device as in claim 3 wherein said second brake shoe element is welded within the opening side of said V-shaped element.

6. A braking device as in claim 3 wherein said second brake shoe element comprises a reinforcing plate extending across the opening side of said V-shaped member.

7. A braking device as in claim 6 wherein said support shaft is attached to and extends from one of said brake shoe assemblies and the other said brake shoe assembly includes means defining a passageway extending therethrough for slidably receiving said support shaft.

8. A braking device as in claim 7 wherein said means defining a passageway includes a hollow cylindrical member mounted on the opening side of said V-shaped member adjacent the apex thereof and inwardly of said second brake element.

9. A braking device as in claim 3 wherein said support shaft is attached to and extends from one of said brake shoe assemblies and the other said brake shoe assembly includes means defining a passageway extending therethrough for slidably receiving said support shaft.

10. A braking device as in claim 9 wherein said second brake shoe element for said one of said brake shoe assemblies comprises one end of said support shaft extending a predetermined distance into the open side of said V-shaped member and wherein said second brake shoe element for the other said brake shoe assembly comprises a reinforcing plate fixedly attached to and extending across the opening side of said V-shaped member.

11. A braking device as in claim 3 wherein said device is constructed of metallic material.

12. A braking device as in claim 11 wherein said metallic material is iron.

13. A braking device as in claim 11 wherein said metallic material is steel.

14. A braking device as in claim 3 wherein said device is constructed from a high strength plastic material.

15. A parking brake as in claim 3 wherein at least one of said brake shoes includes means defining an opening located adjacent said central shaft for receiving the locking arm of a padlock so that the brake can be locked in place.

16. A braking device for a vehicle having spaced apart tandem wheels including a support shaft having a length less than the spacing between the tandem wheels, a pair of brake shoe assemblies mounted on said support shaft and adjusting means provided on said shaft between said pair of brake shoe assemblies for moving the brake shoe assemblies away from one another along a path defined by said support shaft so that when the braking device is positioned between the tandem wheels each of the brake shoes engages one of the tandem wheels, wherein each of said brake shoe assemblies includes first and second brake shoe elements, said first brake shoe element comprising a V-shaped member and wherein said second brake shoe element is fixedly attached within the opening side of said V-shaped member, said second brake shoe element comprising a reinforcing plate fixedly attached to and extending across the opening side of said V-shaped member wherein each of said brake shoe assemblies includes means defining a passageway extending therethrough for slidably receiving said support shaft, said means defining a passageway including a hollow cylindrical member mounted on the opening side of said V-shaped member adjacent the apex thereof and inwardly of said reinforcing plate, said support shaft including threaded and unthreaded portions and stop means secured thereto at the junction of said threaded and unthreaded portions for limiting the movement of one of said brake shoe assemblies therealong and wherein said adjusting means comprises a nut threadedly secured on said threaded portion.

* * * * *